United States Patent
Han et al.

(10) Patent No.: US 11,225,695 B2
(45) Date of Patent: Jan. 18, 2022

(54) DEPHOSPHORIZING FLUX AND METHOD FOR PREPARING SAME

(71) Applicant: POSCO, Pohang-si (KR)

(72) Inventors: Woong Hee Han, Gwangyang-si (KR); Chong Tae Ahn, Gwangyang-si (KR); Jun Jeong Beak, Gwangyang-si (KR); Min Ho Song, Gwangyang-si (KR); Soo Chang Kang, Gwangyang-si (KR)

(73) Assignee: POSCO, Pohang-si (KR)

( * ) Notice: Subject to any disclaimer, the term of this patent is extended or adjusted under 35 U.S.C. 154(b) by 230 days.

(21) Appl. No.: 16/468,811

(22) PCT Filed: Dec. 11, 2017

(86) PCT No.: PCT/KR2017/014456
§ 371 (c)(1),
(2) Date: Jun. 12, 2019

(87) PCT Pub. No.: WO2018/110914
PCT Pub. Date: Jun. 21, 2018

(65) Prior Publication Data
US 2019/0309381 A1 Oct. 10, 2019

(30) Foreign Application Priority Data
Dec. 12, 2016 (KR) .......... 10-2016-0168540

(51) Int. Cl.
*C21C 7/064* (2006.01)
*C21C 7/076* (2006.01)
(Continued)

(52) U.S. Cl.
CPC ............ *C21C 7/0645* (2013.01); *C21C 7/064* (2013.01); *C21C 7/076* (2013.01); *C22C 33/04* (2013.01); *C22C 38/04* (2013.01); *Y02P 10/20* (2015.11)

(58) Field of Classification Search
CPC .................................................. C21C 7/0645
(Continued)

(56) References Cited

U.S. PATENT DOCUMENTS 4,508,571 A 4/1985 Nakato et al.

FOREIGN PATENT DOCUMENTS

| CN | 1124780 | 6/1996 |
|----|---------|--------|
| CN | 103789497 | 5/2014 |

(Continued)

OTHER PUBLICATIONS

Translation for KR 20160072663 A (Year: 2016).*

(Continued)

*Primary Examiner* — Coris Fung
*Assistant Examiner* — Danielle Carda
(74) *Attorney, Agent, or Firm* — Cantor Colburn LLP (57) ABSTRACT

Provided is a dephosphorizing flux configured to adjust a phosphorous component contained in molten steel, the dephosphorizing flux includes a main material including $BaCO_3$ and a supplementary material, wherein the supplementary material includes a first material containing either of $NaHCO_3$ or $Na_2CO_3$ and a second material containing $CaF_2$. Thus, in accordance with a dephosphorizing flux and a method for preparing the same of the present disclosure, the plugging of a lower blowing nozzle that blows a carrier gas during dephosphorization may be prevented while improving a dephosphorization ratio. In addition, since environment polluting substances are not used as in conventional arts, environment pollution risk may be reduced, and the cost burden due to the facility for pollution prevention and harmful substance management may be alleviated.

14 Claims, 1 Drawing Sheet

S121 : $NaHCO_3$ or $Na_2CO_3$
S200 : Mixing (51) Int. Cl.
*C22C 38/04* (2006.01)
*C22C 33/04* (2006.01)

(58) Field of Classification Search
USPC .......................................................... 148/26
See application file for complete search history.

(56) References Cited

FOREIGN PATENT DOCUMENTS

| | | |
|---|---|---|
| CN | 104755634 | 7/2015 |
| EP | 2907880 | 8/2015 |
| JP | S62112716 | 5/1987 |
| JP | H01116023 | 5/1989 |
| JP | 01222014 | 9/1989 |
| JP | 0790337 | 4/1995 |
| JP | 07278644 | 10/1995 |
| JP | 2006188769 | 7/2006 |
| KR | 100889859 | 3/2009 |
| KR | 20100071660 | 6/2010 |
| KR | 101036317 | 5/2011 |
| KR | 101036321 | 5/2011 |
| KR | 101045967 | 7/2011 |
| KR | 101047912 | 7/2011 |
| KR | 101089327 | 12/2011 |
| KR | 101113717 | 2/2012 |
| KR | 101259370 | 4/2013 |
| KR | 20130066130 | 6/2013 |
| KR | 20130066132 | 6/2013 |
| KR | 20130068342 | 6/2013 |
| KR | 101280942 | 7/2013 |
| KR | 20130075278 | 7/2013 |
| KR | 101326050 | 11/2013 |
| KR | 101353208 | 1/2014 |
| KR | 101366298 | 2/2014 |
| KR | 101367301 | 2/2014 |
| KR | 101381856 | 4/2014 |
| KR | 101403581 | 6/2014 |
| KR | 101403583 | 6/2014 |
| KR | 101439763 | 9/2014 |
| KR | 101443785 | 9/2014 |
| KR | 20140106118 | 9/2014 |
| KR | 101460192 | 11/2014 |
| KR | 101460197 | 11/2014 |
| KR | 101485528 | 1/2015 |
| KR | 101485529 | 1/2015 |
| KR | 101504972 | 3/2015 |
| KR | 101504973 | 3/2015 |
| KR | 20160072663 | 6/2016 |
| KR | 101666058 | 10/2016 |
| KR | 101723443 | 4/2017 |
| KR | 101796088 | 11/2017 |
| KR | 101853769 | 5/2018 |

OTHER PUBLICATIONS

Translation for CN 1124780 (Year: 1995).*
KR-20130066130-A Translation (Year: 2013).*
European Search Report—European Application No. 17881160.0 dated Jan. 2, 2020, citing CN 1124780, KR 20130066130, KR 20160072663, KR 20130066132, EP 2907880, JP 0790337, U.S. Pat. No. 4,508,571, KR 101280942.
PCT Written Opinon—PCT/KR2017/014456 dated May 29, 2018, citing KR 10-2016-0072663 and CN 1124780.
Chinese Office Action—Chinese Application No. 201780076874.7 dated Jun. 29, 2020, citing KR 20160072663, CN 1124780, CN 103789497, CN 104755634, KR 20100071660, and KR 20130075278.
Japanese Office Action—Japanese Application No. 2019-530743 dated Jun. 23, 2020, citing JP H01-116023, JP 2006-188769, KR 10-2013-0068342, and JP S62-112716.
International Search Report—PCT/KR2017/014456 dated May 29, 2018.

* cited by examiner

DEPHOSPHORIZING FLUX AND METHOD FOR PREPARING SAME

TECHNICAL FIELD

The present disclosure herein relates to a dephosphorizing flux and a method for preparing the same, and more particularly, to a dephosphorizing flux which is capable of improving the dephosphorization efficiency for ferro-manganese and a method for preparing the same.

BACKGROUND ART

Ferro-manganese used as a ferro alloy for steel is being used to adjust a manganese component in general carbon steel, and used by adding ferro-manganese according to the content of manganese (Mn). Here, when increasing the adding ratio of the ferro-manganese, the influence of carbon (C) and phosphorous (P), which are impurities included in the ferro-manganese, increases.

Recently, a product such as a stainless product which contains Mn up to 25 wt % is being developed and produced. As various product groups containing very high Mn content have been developed and produced, the influence of impurity element, contained in the Mn alloy added into molten steel in order to increase the Mn content, to the quality characteristics of steel products has increased.

The representative Mn-alloy element for increasing the Mn content of steel products are Mn metals containing a very high Mn content of at least 99%, and FeMn products containing 15-30 wt % of Fe.

In case of the Mn metals, due to the characteristics of production processes, high purity is maintained with very low contents of impurity elements, so that the influence to the quality characteristic of steel products is low.

However, in case of FeMn, since being produced to generally contain 6-7 wt % of carbon (C) content, 0.08-0.15 wt % of phosphorous (P) content, and less than 0.1 wt % of nitrogen (N) content, the influence of these elements to steel products is high.

The content of carbon (C) contained in FeMn is lowered to the range of 0.5-7 wt % through a dephosphorization process for reducing carbon (C) by blowing oxygen in a dephosphorization refining furnace. Of course, the carbon (C) content may be controlled to be further lowered, if necessary.

In addition, in case of nitrogen (N), the content thereof may be controlled by a method of minimizing nitrogen mixing in a process of producing FeMn, and thus, there is no serious problem.

Meanwhile, in case of phosphorous (P), since being a representative substance that makes brittleness of steel products to be very high, a dephosphorization process for removing phosphorous (P) is very important in steel making process.

The dephosphorization technology for lowering the phosphorous (P) content in FeMn includes a method of using FeMn slag. This method is a production method using slag generated together with high-carbon FeMn that is produced in an electric furnace for producing FeMn. When producing high-carbon FeMn, since phosphorous (P) is mostly distributed toward high-carbon FeMn due to high affinity of phosphorous (P) to Mn, there is a characteristic in that phosphorous is contained in a very small content in the electric furnace slag. Using this, in the method, FeMn is produced by reducing Mn oxides contained in the slag produced in the electric furnace, and the method has a merit in that FeMn with a very low content of carbon (C) may be produced with a very low content of phosphorous (P). However, in this process, SiMn or Al that contains silicon (Si), which is a reducing agent for reducing slag, should be produced or procured, a large scale furnace body should be operated in which the slag produced in the electric furnace are to be warmed and temperature controlled, and a production process such as a process for inducing reaction of the slag and the reducing agent is complicated and require a very long time, and thus, there is a very adverse effect in the aspects of productivity and cost management.

In order to overcome such limitations, a dephosphorization technique is being developed for directly removing phosphorous (P) from a high-carbon molten steel produced in an electric furnace. Representative technology is a method for dephosphorizing high-carbon FeMn through KR agitation and dephosphorizing flux powder blowing methods using a $BaCO_3$-based flux. In addition, there is a method of controlling the contents of $BaCO_3$ and BaO in order to improve the dephosphorizing flux used for dephosphorization.

The technique for adjusting the ratio of $BaCO_3$—BaO has a problem in that a process becomes complicated because a process stage should be undergone in which calcinations reaction of $BaCO_3$ is induced and BaO should be generated in order to prepare the dephosphorizing flux. In order to use BaO itself, BaO should be produced or procured, but there is a problem in that the production of BaO is difficult in itself, and it is also not easy to store BAO due to a strong hydration reaction. For such reasons, there is no company that industrially produces BaO in large quantities. Therefore, it is also impossible for a FeMn production company to procure and use BaO from another company.

In addition, various research and development have been carried out in which at least one among NaF or $Al_2O_3$ is added to $BaCo_3$ as an additive flux.

However, NaF has both functions for a flux and for improving the dephosphorization efficiency, but is designated as a harmful chemical substance. Thus, in order to use NaF, various safety devices and environmental pollution prevention facilities are being required. In addition, since NaF is expensive due to production characteristics, there is a problem of causing a burden of an increase in production cost.

In addition, the addition of $Al_2O_3$ and the like has a problem of degrading the dephosphorization efficiency.

RELATED PATENT DOCUMENT (Patent document 1) KR0889859B 1
(Patent document 2) KR1036317B 1
(Patent document 3) KR1036321B 1

DISCLOSURE OF THE INVENTION

Technical Problem

The present disclosure herein provides a dephosphorizing flux capable of improving a dephosphorization efficiency for ferro-manganese and a method for preparing the same.

The present disclosure herein also provides a dephosphorizing flux capable of lowering the melting point of slag and securing fluidity and a method for preparing the same.

The present disclosure herein also provides a dephosphorizing flux capable of preventing the occurrence of plugging of a lower blowing nozzle that is provided under a converter, in which dephosphorization is performed, and that blows a gas, and a method for preparing the same. The present disclosure herein also provides a dephosphorizing flux that has a few environment polluting element and is capable of reducing production costs and a method for preparing the same.

Technical Solution

In accordance with an exemplary embodiment, a dephosphorizing flux configured to adjust a phosphorous component contained in molten steel, the dephosphorizing flux including a main material including $BaCO_3$ and a supplementary material, wherein the supplementary material includes a first material containing either of $NaHCO_3$ or $Na_2CO_3$ and a second material containing $CaF_2$.

The first material may include $NaHCO_3$ such that the content ratio ($CaF_2$ wt %/$NaHCO_3$ wt %) of the second material to the first material is greater than 0 and not greater than 2.3.

The first material may include $NaHCO_3$ such that the content ratio ($CaF_2$ wt %/$NaHCO_3$ wt %) of the second material to the first material is greater than 0 and not greater than 1.4.

The first material may include $NaHCO_3$ such that the content ratio ($CaF_2$ wt %/$NaHCO_3$ wt %) of the second material to the first material is 0.5 to 1 inclusive.

The first material may include $Na_2CO_3$ such that the content ratio ($CaF_2$ wt %/$Na_2CO_3$ wt %) of the second material to the first material is greater than 0 and not greater than 4.

The first material may include $Na_2CO_3$ such that the content ratio ($CaF_2$ wt %/$Na_2CO_3$ wt %) of the second material to the first material is 0.7 to 2 inclusive.

The supplementary material may be greater than 0 wt % and not greater than 30 wt % with respect to the total of the dephosphorizing flux.

The supplementary material may be greater than 0 wt % and not greater than 20 wt % with respect to the total of the dephosphorizing flux.

The second material may be at least 2 wt % with respect to the total of the supplementary material.

In accordance with another exemplary embodiment, a method for preparing a dephosphorizing flux configured to adjust a phosphorous component contained in molten steel, the method including: preparing $BaCO_3$ which is a main material; preparing a supplementary material comprising a first material comprising either of $NaHCO_3$ or $Na_2CO_3$ and a second material comprising $CaF_2$; and mixing the main material and the supplementary material.

In the preparing of the supplementary material, when the first material includes $NaHCO_3$, the content ratio ($CaF_2$ wt %/$NaHCO_3$ wt %) of the second material to the first material may be configured to be greater than 0 and not greater than 2.3.

In the preparing of the supplementary material, when the first material includes $NaHCO_3$, the content ratio ($CaF_2$ wt %/$NaHCO_3$ wt %) of the second material to the first material may be configured to be greater than 0 and not greater than 1.4.

In the preparing of the supplementary material, when the first material includes $NaHCO_3$, the content ratio ($CaF_2$ wt %/$NaHCO_3$ wt %) of the second material to the first material may be configured to be 0.5 to 1 inclusive.

When the first material includes $Na_2CO_3$, the content ratio ($CaF_2$ wt %/$Na_2CO_3$ wt %) of the second material to the first material may be configured to be greater than 0 and not greater than 4.

When the first material includes $Na_2CO_3$, the content ratio ($CaF_2$ wt %/$Na_2CO_3$ wt %) of the second material to the first material may be configured to be 0.7 to 2 inclusive.

In the mixing of the main material and the supplementary material, the supplementary material may be added to be at most 30 wt % with respect to the total of the dephosphorizing flux.

In the mixing of the main material and the supplementary material, the supplementary material may be added to be at most 20 wt % with respect to the total of the dephosphorizing flux.

In the preparing of the supplementary material, the second material may be added to be at least 2 wt % with respect to the total of the supplementary material.

Advantageous Effects

In accordance with a dephosphorizing flux and a method for preparing the same of the present disclosure, the plugging of a lower blowing nozzle that blows a carrier gas during dephosphorization may be prevented while improving a dephosphorization ratio. In addition, since environment polluting substances are not used as in conventional arts, environment pollution risk may be reduced, and the cost burden due to the facility for pollution prevention and harmful substance management may be alleviated. In addition, there is a cost reduction effect by using $NaHCO_3$ or $Na_2CO_3$ and $CaF_2$ which are relatively cheap.

MODE FOR CARRYING OUT THE INVENTION

Hereinafter, exemplary embodiments will be described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The present disclosure herein provides a dephosphorizing flux used for lowering the content of phosphorous (P) in a ferro-manganese (FeMn) molten steel and a method for producing the same. More specifically, the present disclosure herein provides a dephosphorizing flux which is capable of lowering the melting point of a dephosphorizing flux and slag and improving the dephosphorization efficiency of the ferro-manganese while securing fluidity, has a few environment-polluting elements, and is capable of reducing production costs, and a method for producing the same. As a more specific example, the present disclosure provides a dephosphorizing flux with which dephosphorization is performed with regard to a high-carbon ferro-manganese (FeMn) molten steel having a carbon content of 5-7 wt %, and a method for producing the same.

In addition, the present disclosure herein also provides a dephosphorizing flux which has a dephosphorization ratio due to the dephosphorizing flux is at least 30% and is capable of causing no-plugging of a lower blowing nozzle or preventing the occurrence of plugging of the lower blowing nozzle, and a method for producing the same.

The dephosphorizing flux in accordance with an exemplary embodiment includes at least any one among BaCo3, $NaHCO_3$ or $Na_2CO_3$, which is a highly alkaline material, and $CaF_2$.

Meanwhile, when the dephosphorizing flux including $BaCO_3$, which is a highly alkaline material is added into a ferro-manganese molten steel, phosphorous (P) in the ferro-manganese and oxygen react to form a phosphate ($P_2O_5$), and the phosphate ($P_2O_5$) is collected by the highly alkaline material and transits into a stable phase. Here, when a highly alkaline oxide is used for the dephosphorizing flux, since the oxide should be present in a liquid phase sate in order to promote a reaction with the phosphate ($P_2O_5$), a flux is used for lowering the melting point of slag. In addition, it is necessary to use an additive for improving the dephosphorization ratio.

The dephosphorizing flux in accordance with an exemplary embodiment is configured to contain, with respect to the total wt % (100 wt %) of the dephosphorizing flux, at least 70 wt % of a main material and at most 30 wt % of supplementary materials. More favorably, at least 80 wt % of main material and at most 20 wt % of supplementary materials are configured to be contained. Here, the main material may be $BaCO_3$, and the supplementary materials include at least any one of $NaHCO_3$ or $Na_2CO_3$, and $CaF_2$.

Figure 1:
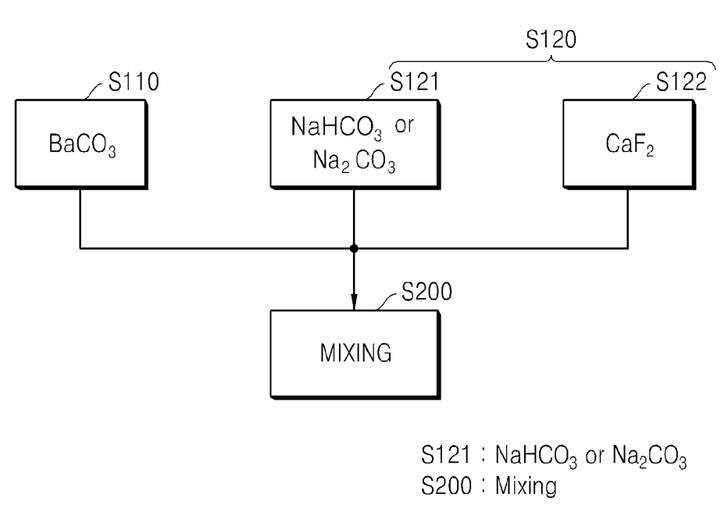
FIG. 1 is a flowchart showing a method for preparing a dephosphorizing flux in accordance with an exemplary embodiment.

FIG. 1 is a flowchart showing a method for preparing a dephosphorizing flux in accordance with an exemplary embodiment.

Hereinafter referring to FIG. 1, a method for preparing a dephosphorizing flux in accordance with an exemplary embodiment will be described.

Referring to FIG. 1, a method for preparing a dephosphorizing flux in accordance with an exemplary embodiment includes: preparing $BaCO_3$, which is a main material (S110); preparing supplementary materials (S120); and mixing the main material and the supplementary materials (S200).

The preparing of the supplementary materials (120) includes preparing a first material and a second material (S121 and S122). Here, the first material includes either of $NaHCO_3$ or $Na_2CO_3$, and the second material includes $CaF_2$. $NaHCO_3$ or $Na_2CO_3$, functions as a flux for lowering the melting points of the dephosphorizing flux and slag. In addition, $CaF_2$ functions as an additive for improving the dephosphorization efficiency.

In the mixing of the main material and the supplementary material (S200), the supplementary materials are added so as to be at most 30 wt %, more favorably, at most 20 wt % with respect to the total of the dephosphorizing flux. For example, when the supplementary materials exceed 30 wt %, there is a problem in that the highly alkaline effect due to the use of $BaCO_3$ is reduced, and the dephosphorization ratio decreases.

The supplementary material is a mixture of the first material and the second material, and $NaHCO_3$ or $Na_2CO_3$ are used as the first material and $CaF_2$ is used as the second material. That is, the supplementary material in accordance with an exemplary embodiment may be configured to include, for example, $NaHCO_3$ and $CaF_2$ or to include $Na_2CO_3$ and $CaF_2$.

Thus, the dephosphorizing flux in accordance with an exemplary embodiment may be configured to include, for example, $NaHCO_3$ and $CaF_2$ or to include $Na_2CO_3$ and $CaF_2$.

When adding a powder-state dephosphorizing flux including $NaHCO_3$ is added into molten steel, a reaction such as the following reaction formula 1 from a low temperature of 60° C. and a large quantity of $H_2O$ and $CO_2$ are generated simultaneously with blowing. Due to this gas, there is an effect of improving agitating capability of the molten steel, and thus, an additional effect of increasing dephosphorization efficiency may be exhibited. In addition, finally generated $Na_2CO_3$ is a material having a low melting point of 851° C., and functions as a flux that lowers the melting point of generated dephosphorization slag.

$$2NaHCO_3 \rightarrow Na_2CO_3 + H_2O + CO_2 \qquad \text{Reaction formula 1)}$$

Even when directly using $Na_2CO_3$ as the first material, the same effect may be generated. That is, the supplementary material may include $Na_2CO_3$ as the first material, and $CaF_2$ as the second material. When directly using $Na_2CO_3$, an effect of increasing the ratio of Na element itself by two times than $NaHCO_3$ is generated, and an effect is exhibited in which $Na_2CO_3$ is mixed into the dephosphorization slag by a higher content than $NaHCO_3$. Thus, an effect of further increasing the function as a flux is exhibited and thus, a dephosphorization effect which is equal to or similar to that of $NaHCO_3$ is exhibited.

When using the dephosphorizing flux in accordance with the exemplary embodiments, the dephosphorization ratio may be improved by at least 30%. In addition, since the melting points of the dephosphorizing flux and the slag may be lowered and a high fluidity may thereby be maintained, a reaction efficiency with molten steel is high, and since being provided under a converter, the plugging of lower blowing nozzle that blows a carrier gas may be prevented.

In addition, in mixing the main material and the supplementary material including the first material and the second material, the dephosphorization ratio may further be improved by appropriately adjusting the weight ratio of the second material to the first material.

For example, when using $NaHCO_3$ as the first material, it is effective that the weight ratio (that is, $CaF_2$ wt %/$NaHCO_3$ wt %) of the second material ($CaF_2$) to the first material ($NaHCO_3$) is adjusted to be greater than 0 and not greater than 2.3. Favorably, the weight ratio (that is, $CaF_2$ wt %/$NaHCO_3$ wt %) of the second material ($CaF_2$) to the first material ($NaHCO_3$) is adjusted to be greater than approximately 0 and not greater than 1.4, or more favorably, to be 0.5 to 1 inclusive. The weight ratio (that is, $CaF_2$ wt %/$NaHCO_3$ wt %) of the second material ($CaF_2$) to the first material ($NaHCO_3$) may be adjusted by adjusting the adding amount of the first material, or adjusting the adding amount of the second material.

In addition, in order to improve the dephosphorization efficiency, it is effective to add the second material ($CaF_2$) to be at least 2 wt % with respect to the total of the supplementary material. That is, there is a tendency that a higher dephosphorization ratio is exhibited when the weight ratio (that is, $CaF_2$ wt %/$NaHCO_3$ wt %) of the second material ($CaF_2$) to the first material ($NaHCO_3$) is greater than 0 and not greater than 2.3, than that when the second material ($CaF_2$) is at least 2 wt %, and thus, it is more effective that the second material ($CaF_2$) is added to be at least 2 wt % with respect to the total of the supplementary material.

Meanwhile, when the second material ($CaF_2$) is less than 2 wt %, there is a method of increasing the content of the first material ($NaHCO_3$) in order to adjust the weight ratio (that is, $CaF_2$ wt %/$NaHCO_3$ wt %) of the second material ($CaF_2$) to the first material ($NaHCO_3$) to be at most 2.3. However, in this method, the dephosphorization ratio is relatively low than that when the second material ($CaF_2$) is at least 2 wt % and the weight ratio (that is, $CaF_2$ wt %/$NaHCO_3$ wt %) of the second material ($CaF_2$) is adjusted to be at most 2.3. Accordingly, while adjusting the second material ($CaF_2$)

having a larger direct influence to be at least 2 wt %, the weight ratio (that is, CaF$_2$ wt %/NaHCO$_3$ wt %) of the second material (CaF$_2$) to the first material (NaHCO$_3$) to be at most 2.3, favorably greater than 0 and not greater than 1.4, and more favorably, 0.5 to 1 inclusive.

In another example, when using Na$_2$CO$_3$ as the first material, the weight ratio (that is, CaF$_2$ wt %/Na$_2$CO$_3$ wt %) of the second material (CaF$_2$) to the first material (Na$_2$CO$_3$) is favorably adjusted to greater than 0 and not greater than 4, and more favorably adjusted to be 0.7 to 2 inclusive. The weight ratio (that is, CaF$_2$ wt %/Na$_2$CO$_3$ wt %) of the second material (CaF$_2$) to the first material (Na$_2$CO$_3$) may be adjusted by adjusting the adding amount of the first material, or adjusting the adding amount of the second material.

Also in this case, it is effective to add the second material (CaF$_2$) to be at least 2 wt % with respect to the total of the supplementary material. That is, there is a tendency that a higher dephosphorization ratio is exhibited when the weight ratio (that is, CaF$_2$ wt %/Na$_2$CO$_3$ wt %) of the second material (CaF$_2$) to the first material (NaHCO$_3$) is at most 4 than that when the second material (CaF$_2$) is less than 2 wt %, and thus, it is effective that the second material (CaF$_2$) is added to be at least 2 wt % with respect to the total of the supplementary material.

Meanwhile, when the second material (CaF$_2$) is less than 2 wt %, there is a method of increasing the content of the first material (Na$_2$CO$_3$) in order to adjust the weight ratio (that is, CaF$_2$ wt %/Na$_2$CO$_3$ wt %) of the second material (CaF$_2$) to the first material (Na$_2$CO$_3$) to be at most 4. However, in this method, the dephosphorization ratio is relatively low than that when the second material (CaF$_2$) is at least 2 wt % and the weight ratio (that is, CaF$_2$ wt %/Na$_2$CO$_3$ wt %) of the second material (CaF$_2$) is adjusted to be at most 4. Accordingly, while adjusting the second material (CaF$_2$) having a larger direct influence to be at least 2 wt %, the weight ratio (that is, CaF$_2$ wt %/Na$_2$CO$_3$ wt %) of the second material (CaF$_2$) to the first material (Na$_2$CO$_3$) to be greater than 0 and not greater than 4, and more favorably, 0.7 to 2 inclusive.

Hereinafter, this will be described through specific and various examples and comparative examples of exemplary embodiments.

Table 1 shows the composition of the dephosphorizing fluxes in accordance with first to sixth comparative examples, and Table 3 shows the dephosphorization ratio when using the dephosphorizing fluxes in accordance with the first to sixth comparative examples and shows whether a lower blowing nozzle provided under a converter is plugged.

Table 2 shows the composition of the dephosphorizing fluxes in accordance with first to ninth examples, and Table 4 shows the dephosphorization ratio when using the dephosphorizing fluxes in accordance with the first to ninth examples and shows whether a lower blowing nozzle provided under a converter is plugged.

The first comparative example is a dephosphorizing flux (BaCO$_3$ 100 wt %) which includes only BaCO$_3$, does not include NaHCO$_3$ or Na$_2$CO$_3$, and does not include CaF$_2$. In addition, the second comparative example is a dephosphorizing flux which includes BaCO$_3$ and 10 wt % of NaHCO$_3$, and does not include CaF$_2$. In addition, the third and fourth comparative examples are dephosphorizing fluxes which include BaCO$_3$ and Na$_2$CO$_3$, the third comparative example contains 10 wt % of Na$_2$CO$_3$, and the fourth example contains 20 wt % of Na$_2$CO$_3$. In addition, the fifth and sixth comparative examples are dephosphorizing fluxes which include BaCO$_3$ and CaF$_2$, and do not include NaHCO$_3$ or Na$_2$CO$_3$. Here, the content of CaF$_2$ are different in the fifth and sixth comparative examples In addition, the dephosphorizing fluxes in accordance with the first to ninth comparative examples each include BaCO$_3$ as the main material, NaHCO$_3$ or Na$_2$CO$_3$ as the first material for the supplementary material, and CaF$_2$ as the second material. Here, the dephosphorizing fluxes in accordance with the first to fifth comparative examples each include BaCO$_3$, NaHCO$_3$, and CaF$_2$, and each have different composition contents of respective components. In addition, the dephosphorizing fluxes in accordance with the sixth to ninth comparative examples each include BaCO$_3$, Na$_2$CO$_3$, and CaF$_2$, and each have different composition contents of respective components.

In addition, in the composition of the first to sixth comparative examples and the first to seventh comparative examples, although the BaCO$_3$ content is not described, the BaCO$_3$ content is the remaining content excluding the supplementary material with respect to total dephosphorizing flux of 100 wt %.

TABLE 1

| | Dephosphorizing flux composition | Second material (CaF$_2$)/ First material (NaHCO$_3$ or N$_2$CO$_3$) ratio | Second material (CaF$_2$) content + first material (NaHCO$_3$ or N$_2$CO$_3$) content (wt %) |
|---|---|---|---|
| First comparative example | BaCO$_3$ | — | 0 wt % |
| Second comparative example | BaCO$_3$ + NaHCO$_3$ (10 wt %) | — | 10 wt % (NaHCO$_3$ 10 wt %) |
| Third comparative example | BaCO$_3$ + Na$_2$ CO$_3$ (10 wt %) | — | 10 wt % (Na$_2$ CO$_3$ 10 wt %) |
| Fourth comparative example | BaCO$_3$ + Na$_2$ CO$_3$ (20 wt %) | — | 20 wt % (Na$_2$ CO$_3$ 20 wt %) |
| Fifth comparative example | BaCO$_3$ + CaF$_2$ (5 wt %) | — | 5 wt % (CaF$_2$ 5 wt %) |
| Sixth comparative example | BaCO$_3$ + CaF$_2$ (10 wt %) | — | 10 wt % (CaF$_2$ 10 wt %) |

TABLE 2

|  | Dephosphorizing flux composition | Second material (CaF$_2$)/ First material (NaHCO$_3$ or N$_2$CO$_3$) ratio | Second material (CaF$_2$) content + first material (NaHCO$_3$ or N$_2$CO$_3$) content (wt %) |
| --- | --- | --- | --- |
| First comparative example | BaCO$_3$ + NaHCO$_3$ (5 wt %) + CaF$_2$ (7 wt %) | 1.4 | 12 wt % (NaHCO$_3$ 5 wt % ++ CaF$_2$ 7 wt %) |
| Second comparative example | BaCO$_3$ + NaHCO$_3$ (7 wt %) + CaF$_2$ (7 wt %) | 1 | 14 wt % (NaHCO$_3$ 7 wt % + CaF$_2$ 7 wt %) |
| Third comparative example | BaCO$_3$ + NaHCO$_3$ (12 wt %) + CaF$_2$ (7 wt %) | 0.58 | 19 wt % NaHCO$_3$ 12 wt % ++ CaF$_2$ 7 wt %) |
| Fourth comparative example | BaCO$_3$ + NaHCO$_3$ (5 wt %) + CaF$_2$ (10 wt %) | 2 | 15 wt % (NaHCO$_3$ 5 wt % + CaF$_2$ 10 wt %) |
| Fifth comparative example | BaCO$_3$ + NaHCO$_3$ (3 wt %) + CaF$_2$ (7 wt %) | 2.3 | 10 wt % NaHCO$_3$ 3 wt % ++ CaF$_2$ 7 wt %) |
| Sixth comparative example | BaCO$_3$ + Na$_2$CO$_3$ (7 wt %) + CaF$_2$ (5 wt %) | 0.71 | 12 wt % Na$_2$CO$_3$ 7 wt % + CaF$_2$ 5 wt %) |
| Seventh comparative example | BaCO$_3$ + Na$_2$CO$_3$ (3 wt %) + CaF$_2$ (7 wt %) | 2.3 | 10 wt % Na$_2$CO$_3$ 3 wt % + CaF$_2$ 7 wt % |
| Eighth comparative example | BaCO$_3$ + Na$_2$CO$_3$ (3 wt %) + CaF$_2$ (12 wt %) | 4 | 15 wt % Na$_2$CO$_3$ 3 wt % + CaF$_2$ 12 wt %) |
| Ninth comparative example | BaCO$_3$ + Na$_2$CO$_3$ (5 wt %) + CaF$_2$ (10 wt %) | 2 | 15 wt % Na$_2$CO$_3$ 5 wt % + CaF$_2$ 10 wt %) |

TABLE 3

|  | Dephosphorization initial stage [P] (wt %) | Dephosphorization completion [P] (wt %) | Dephosphorization ratio [P] (wt %) | Lower blowing nozzle plugging |
| --- | --- | --- | --- | --- |
| First comparative example | 0.106 | 0.065 | 39 | Plugging occurs |
| Second comparative example | 0.112 | 0.088 | 21.8 | Plugging does not occur |
| Third comparative example | 0.104 | 0.085 | 18.1 | Plugging does not occur |
| Fourth comparative example | 0.118 | 0.091 | 22.6 | Plugging does not occur |
| Fifth comparative example | 0.101 | 0.061 | 39.2 | Plugging occurs |
| Sixth comparative example | 0.107 | 0.058 | 45.4 | Plugging occurs |

TABLE 4

|  | Dephosphorization initial stage [P] (wt %) | Dephosphorization completion [P] (wt %) | Dephosphorization ratio [P] (wt %) | Lower blowing nozzle plugging |
| --- | --- | --- | --- | --- |
| First comparative example | 0.109 | 0.047 | 49 | Plugging does not occur |
| Second comparative example | 0.099 | 0.040 | 60 | Plugging does not occur |

TABLE 4-continued

| | Dephosphorization initial stage [P] (wt %) | Dephosphorization completion [P] (wt %) | Dephosphorization ratio [P] (wt %) | Lower blowing nozzle plugging |
|---|---|---|---|---|
| Third comparative example | 0.118 | 0.049 | 58.5 | Plugging does not occur |
| Fourth comparative example | 0.121 | 0.065 | 46.2 | Plugging does not occur |
| Fifth comparative example | 0.132 | 0.077 | 41.7 | Plugging does not occur |
| Sixth comparative example | 0.105 | 0.04 | 61.9 | Plugging does not occur |
| Seventh comparative example | 0.105 | 0.071 | 32.4 | Plugging does not occur |
| Eighth comparative example | 0.123 | 0.079 | 35.4 | Plugging does not occur |
| Ninth comparative example | 0.095 | 0.054 | 42.8 | Plugging does not occur |

For the experiment, dephosphorization was performed with respect to high-carbon ferro-manganese molten steel containing 5-7 wt % of carbon. In addition, the dephosphorization method was performed such that a lance was immersed in the ferro-manganese molten steel, and then while blowing a carrier gas through a lower blowing nozzle provided under a converter, a dephosphorizing flux was blown into the molten steel. In order to compare under the same conditions, the same unit of the flux of 140 kg/ton was blown, and the final temperature when completing the blowing of the dephosphorizing flux and completing a dephosphorization process were managed to be the same, that is, to be at most 1,310° C.

The dephosphorizing fluxes in accordance with the first to sixth examples and ninth examples have higher dephosphorization ratio than the first comparative example. This is resulted in the example, by an effect of lowering the melting point due to NaHCo3 or $Na_2CO_3$, an effect of securing fluidity and improving agitating efficiency, and an effect of improving dephosphorization ratio due to $CaF_2$. Meanwhile, in case of the first comparative example, since the dephosphorizing flux includes only $BaCO_3$, which is highly alkaline substance and contains a large quantity of $BaCO_3$, the melting points of the dephosphorizing flux and slag are raised, and thus, the fluidity is lowered. Therefore, the dephosphorization ratio is lower than those in the first to sixth examples and ninth examples.

In addition, when comparing the second comparative example and the first to fifth examples which include $NaHCO_3$ aside from $BaCO_3$, the dephosphorization ratios in the first to fifth examples are 1.9 times higher than that in the second comparative example. More specifically, the dephosphorization ratio in the fifth example is 1.9 times higher than that in the first comparative example, and the dephosphorization ratios in the first to fourth examples are 2 times higher, and among these, those in the second and third examples are at least 2.5 times higher.

Meanwhile, the dephosphorization ratio in the second comparative example is higher than that in the third comparative example including 10 wt % of $Na_2CO_3$, and is similar to that in the fourth comparative example including 20 wt % of $Na_2CO_3$, but is lower than those of the dephosphorizing fluxes in accordance with the first to ninth examples. This is because the second comparative example does not include $CaF_2$ that directly affects the dephosphorization ratio.

In addition, when comparing the third to fourth comparative examples and the sixth to ninth examples which include $Na_2CO_3$ aside from $BaCO_3$, the dephosphorization ratio in the sixth to ninth examples are approximately 1.4 times higher than those in the third and fourth comparative examples. This is because the third and fourth comparative examples do not include $CaF_2$, but the sixth to ninth examples include $CaF_2$ aside from $Na_2CO_3$. In addition, the dephosphorizing fluxes (the third and fourth comparative examples) in which only $Na_2CO_3$ is added as the supplementary material functions as a flux in the initial dephosphorization stage, lowers the melting point of the dephosphorizing flux and maintains a molten state, but as the dephosphorization operation is performed, a phenomenon occurs in which the function as the flux may not be performed while $Na_2CO_3$ is volatized together with the generation of Mn oxides, and thus, the dephosphorization ratio decreases due to solidification of the dephosphorization slag.

Meanwhile, when comparing dephosphorization ratios in accordance with the first comparative example, which does not include $CaF_2$ and $NaHCO_3$ or $Na_2CO_3$, and the fifth and sixth comparative examples which do not include $NaHCO_3$ or $Na_2CO_3$, are higher than those in accordance with the seventh to eight examples which include $Na_2CO_3$ and $CaF_2$. In addition, when comparing the fifth and sixth comparative examples, a tendency is shown in which the higher the $CaF_2$ content, the higher the dephosphorization ratio.

However, in case of the dephosphorizing flux including only $BaCO_3$ (the first comparative example), or including only $BaCO_3$ and $CaF_2$ (the fifth and sixth comparative examples), the dephosphorization slag is solidified due to CaO generated while the dephosphorization progresses. Thus, the fluidity of the slag that covers a melt surface becomes very low, and this causes the plugging of a lower blowing nozzle which is provided under a converter and blows an inert gas or a carrier gas in order to move or agitate the powder-like dephosphorizing flux. Therefore, a scattering phenomenon of the molten steel remarkably occurs while the dephosphorization progresses, and in a severe case, a phenomenon of flooding outside a ladle also occurs, and thus, there is a problem of substantially degrading operability.

In addition, in case of the first comparative example, and the fifth to sixth comparative examples, the reaction rate with the molten steel is decreased due to the degradation in the fluidity of the dephosphorizing flux, the dephosphorization ratio is lower than those of the first to sixth examples and the ninth example.

Accordingly, the dephosphorizing fluxes in accordance with exemplary embodiments are configured to include $BaCO_3$, $NaHCO_3$ and $CaF_2$ or to include $BaCO_3$, $Na_2CO_3$ and $CaF_2$, so that the lower blowing nozzle plugging phenomenon may be prevented while having a dephosphorization ratio of at least 30%.

In addition, in accordance with exemplary embodiments, the dephosphorization ratio may further increased by adjusting the ratio of the first material to the second material ($CaF_2$ wt %/$NaHCO_3$ wt % or $CaF_2$ wt %/$Na_2CO_3$ wt %) that constitutes the supplementary material.

That is, when comparing the first to fifth examples, the dephosphorization ratios of the dephosphorizing fluxes in accordance with the first to third examples, in which the ratio of the first material to the second material ($CaF_2$ wt %/$NaHCO_3$ wt % or $CaF_2$ wt %/$Na_2CO_3$ wt %) is greater than 0 and not greater than 1.4, exceed 1.4, and this is higher than those of the fourth to fifth examples in which dephosphorization ratio is at most 2.3. This is because the supplementary materials similarly include $NAHCO_3$ and $CaF_2$ in the first to fifth examples, but in case of the first to third examples the weight ratio of $CaF_2$ to $NaHCO_3$ (that is, $CaF_2$ wt %/$NaHCO_3$ wt %) is adjusted to be at most 1.4 while adjusting the $NaHCO_3$ content corresponding to the $CaF_2$ content. In other words, this is because in case of the first to third examples, the weight ratio of $CaF_2$ to $NaHCO_3$ (that is, $CaF_2$ wt %/$NaHCO_3$ wt %) is at most 1.4 while the adding ratio of $CAF_2$ is reduced compared to those in the fourth to fifth examples, a larger melting point lowering effect due to $NaHCO_3$ is exhibited in the first to third examples than those in the fourth to fifth examples.

In addition, among the first to fifth example, the dephosphorization ratios of the dephosphorizing fluxes in accordance with the second to third examples, in which the ratio of the first material to the second material ($CaF_2$ wt %/$NaHCO_3$ wt %) is 0.5 to 1 inclusive, are higher than those in the first, fourth and fifth examples in which the ratio of the first material to the second material exceeds approximately 1. This is because in the case of the second and third examples, while the adding ratio of $CaF_2$ decreases compared to the first, fourth, and fifth examples, the weight ratio of $CAF_2$ to $NaHCO_3$ (that is, $CaF_2$ wt %/$NaHCO_3$ wt %) is 0.5 to 1 inclusive, and thus, a larger melting point lowering effect due to $NaHCO_3$ is exhibited in the second and third examples than those in the first, fourth and fifth examples.

In addition, the third example shows the result in which dephosphorization was performed in the same manner after mixing $NaHCO_3$ and $CaF_2$ while the content ratio of $NaHCO_3$ is increased up to 12 wt % with respect to the $CaF_2$ content of 7 wt % in the same manner as the second example. As a result, it was confirmed that the third example exhibited the equal or a similar level of dephosphorization ratio to the second example.

In addition, the dephosphorization ratios of the dephosphorizing fluxes in accordance with the first and fourth examples, in which the weight ratio of $CAF_2$ to $NaHCO_3$ (that is, $CaF_2$ wt %/$NaHCO_3$ wt %) is greater than 1 and not greater than 2, are higher than those of the first to sixth comparative examples, and the plugging of the lower blowing nozzle does not occur.

Comparing the sixth to ninth examples, the dephosphorization ratio of the dephosphorizing fluxes in accordance with the sixth example is higher than those of the dephosphorizing fluxes in accordance with the seventh to ninth examples. This is because in case of the dephosphorizing fluxes in accordance with the sixth example, the weight ratio of $CaF_2$ to $Na_2CO_3$ is adjusted to be 0.7 to 2 inclusive, and the degree of increase in the melting point of slag due to an increase in CaO according to a progress in dephosphorization is relatively lower than those in the seventh to ninth examples, and the reaction efficiency is relatively high.

In addition, it may be found that the sixth example, which includes $BaCO_3$, $Na_2CO_3$ and $CaF_2$ and in which the weight ratio of $CaF_2$ to $Na_2CO_3$ is 0.7 to 2 inclusive, exhibits a dephosphorization ratio which is equal or similar to those of the second and third examples which includes $BaCO_3$, $NaHCO_3$ and $CaF_2$ and in which the weight ratio of $CaF_2$ to $NaHCO_3$ is 0.5 to 1.4 inclusive.

As such, according to the dephosphorizing flux in accordance with an exemplary embodiment, the plugging of the lower blowing nozzle that blows a carrier gas during dephosphorization may be prevented while securing a dephosphorization ratio of at least 30%. In addition, in configuring the supplementary material for the dephosphorizing flux, The occurrence of nozzle plugging may be prevented or suppressed while securing a dephosphorization ratio of at least 41% by adjusting the weight ratio (that is, $CaF_2$ wt %/$NaHCO_3$ wt %) of the second material ($CaF_2$) to the first material ($NaHCO_3$) to be greater than 0 and not greater than 2.3. In addition, favorably, the occurrence of nozzle plugging may be prevented or suppressed while securing a dephosphorization ratio of at least 49% by adjusting the weight ratio (that is, $CaF_2$ wt %/$NaHCO_3$ wt %) of the second material ($CaF_2$) to the first material ($NaHCO_3$) to be greater than 0 and not greater than 1.4. In addition, more favorably, the occurrence of nozzle plugging may be prevented or suppressed while securing a dephosphorization ratio of at least 55% by adjusting the weight ratio (that is, $CaF_2$ wt %/$NaHCO_3$ wt %) of the second material ($CaF_2$) to the first material ($NaHCO_3$) to be greater than 0.5 and not greater than 1.

In addition, the occurrence of nozzle plugging may be prevented or suppressed while securing a dephosphorization ratio of at least 30% by adjusting the weight ratio (that is, $CaF_2$ wt %/$NaHCO_3$ wt %) of the second material ($CaF_2$) to the first material ($NaHCO_3$) to be greater than 0 and not greater than 4. More favorably, the occurrence of nozzle plugging may be prevented or suppressed while securing a dephosphorization ratio of at least 40% by adjusting the weight ratio (that is, $CaF_2$ wt %/$NaHCO_3$ wt %) of the second material ($CaF_2$) to the first material ($NaHCO_3$) to be 0.7 to 2 inclusive.

In addition, since environment polluting substances are not used as in conventional arts, environment pollution risk may be reduced, and the cost burden due to the facility for pollution prevention and harmful substance management may be alleviated. In addition, there is a cost reduction effect by using $NaHCO_3$ or $Na_2CO_3$ and $CaF_2$ which are relatively cheap

INDUSTRIAL APPLICABILITY

According to the dephosphorizing flux and a method for preparing the same in accordance with exemplary embodiments, the plugging of a lower blowing nozzle that blows a carrier gas during dephosphorization may be prevented while improving a dephosphorization ratio. In addition, since environment polluting substances are not used as in conventional arts, environment pollution risk may be reduced, and the cost burden due to the facility for pollution prevention and harmful substance management may be alleviated.

What is claimed is:

1. A dephosphorizing flux to adjust a phosphorous component contained in molten steel, the dephosphorizing flux comprising a main material comprising $BaCO_3$ and a supplementary material,
wherein the supplementary material comprises a first material comprising $NaHCO_3$ and a second material comprising $CaF_2$.

2. The dephosphorizing flux of claim 1, wherein the first material comprises $NaHCO_3$ such that a content ratio of $CaF_2$ wt %/$NaHCO_3$ wt % of the second material to the first material is greater than 0 and not greater than 2.3.

3. The dephosphorizing flux of claim 2, wherein the first material comprises $NaHCO_3$ such that the content ratio ($CaF_2$ wt%/$NaHCO_3$ wt%) of the second material to the first material is greater than 0 and not greater than 1.4.

4. The dephosphorizing flux of claim 3, wherein the first material comprises $NaHCO_3$ such that the content ratio of $CaF_2$ wt %/$NaHCO_3$ wt % of the second material to the first material is 0.5 to 1 inclusive.

5. The dephosphorizing flux of claim 1, wherein the supplementary material is greater than 0 wt % and not greater than 30 wt % with respect to the total of the dephosphorizing flux.

6. The dephosphorizing flux of claim 5, wherein the supplementary material is greater than 0 wt % and not greater than 20 wt % with respect to the total of the dephosphorizing flux.

7. The dephosphorizing flux of claim 1, wherein the second material is at least 2 wt % with respect to the total of the supplementary material.

8. A method for preparing a dephosphorizing flux to adjust a phosphorous component contained in molten steel, the method comprising:
preparing $BaCO_3$ which is a main material;
preparing a supplementary material comprising a first material comprising $NaHCO_3$ and a second material comprising $CaF_2$; and
mixing the main material and the supplementary material.

9. The method of claim 8, wherein in the preparing of the supplementary material, when the first material comprises $NaHCO_3$, the content ratio of $CaF_2$ wt %/$NaHCO_3$ wt % of the second material to the first material is configured to be greater than 0 and not greater than 2.3.

10. The method of claim 9, wherein in the preparing of the supplementary material, when the first material comprises $NaHCO_3$, the content ratio of $CaF_2$ wt %/$NaHCO_3$ wt % of the second material to the first material is configured to be greater than 0 and not greater than 1.4.

11. The method of claim 10, wherein in the preparing of the supplementary material, when the first material comprises $NaHCO_3$, the content ratio of $CaF_2$ wt %/$NaHCO_3$ wt % of the second material to the first material is configured to be 0.5 to 1 inclusive.

12. The method of claim 8, wherein in the mixing of the main material and the supplementary material, the supplementary material is added to be at most approximately 30 wt % with respect to the total of the dephosphorizing flux.

13. The method of claim 12, wherein in the mixing of the main material and the supplementary material, the supplementary material is added to be at most 20 wt % with respect to the total of the dephosphorizing flux.

14. The method of claim 8, wherein in the preparing the supplementary material, the second material is added to be at least 2 wt % with respect to the total of the supplementary material.

* * * * *